United States Patent [19]
Ohmura et al.

[11] Patent Number: 5,240,964
[45] Date of Patent: Aug. 31, 1993

[54] PROCESS FOR PRODUCING URETHANE FOAM WITH HIGH DENSITY SKIN

[75] Inventors: Hirokazu Ohmura, Niiza; Kimio Yoshimura, Urawa; Satoshi Narumi, Tochigi, all of Japan

[73] Assignee: Tokyo Seat Co., Ltd., Saitama, Japan

[21] Appl. No.: 762,856

[22] Filed: Sep. 18, 1991

[30] Foreign Application Priority Data

Sep. 19, 1990 [JP] Japan ................................. 2-249742
Jul. 22, 1991 [JP] Japan ................................. 3-204586

[51] Int. Cl.$^5$ ............................. C08J 9/08; C08G 8/20
[52] U.S. Cl. ...................................... 521/51; 521/128; 521/129
[58] Field of Search .......................... 521/51, 128, 129

[56] References Cited

U.S. PATENT DOCUMENTS

| | | | |
|---|---|---|---|
| 4,701,473 | 10/1987 | Hasegawa et al. | 521/51 |
| 4,981,877 | 1/1991 | Carswell | 521/51 |
| 5,057,543 | 10/1991 | Carswell | 521/137 |
| 5,070,110 | 12/1991 | Carswell et al. | 521/155 |

Primary Examiner—Morton Foelak
Attorney, Agent, or Firm—Hill, Steadman & Simpson

[57] ABSTRACT

A process for producing a urethane foam having a high density outer surface layer, of the type wherein a plastic liquid containing aromatic isocyanates, polyols, a catalyst, low-molecular polyols used as a crosslinker or a chain extender, a blowing agent consisting of water, and an assistant is poured into a closed mold through a one-shot molding process, a certain type of catalyst is added to create a difference in gas evolving reaction between an inner part and an outer part of the plastic liquid within the mold so as to form a high density layer on the outer surface of a urethane form. The catalyst includes a piperazine compound, a morpholine compound, or a mixture thereof. An imidazole compound, a triazine compound, an amidine compound or an organic acid salt of the amidine compound, or a mixture resulting from any combination thereof may be used in combination with the piperazine compound or a morpholine compound.

3 Claims, 1 Drawing Sheet

PROCESS FOR PRODUCING URETHANE FOAM WITH HIGH DENSITY SKIN

BACKGROUND OF THE INVENTION

1. Field of the Invention:

The present invention relates generally to the production of urethane foams, and more particularly to a process for producing a urethane foam having a high density outer surface layer (which is of the so-called "urethane foam with integral skin" type) suitable for use as interior parts of an automobile, a ship, etc., or component parts of a furniture.

2. Description of the Prior Art:

In the production of urethane foams having a high density outer surface layer, it has been customarily practice to use the chlorofluorocarbon blowing agents such as CFC-11 or CFC-113 (CFC=chlorofluorocarbon) together with a catalyst such as 1,4-diazabicyclo(2,2,2)octane or dibutyltin dilaurate. Typical examples of such prior practice are disclosed in Japanese Patent Publication Nos. 55-21045 and 55-27098.

During the reactions that produce a urethane foam, the heat of reaction is conducted to a metal mold, thereby creating a temperature difference in the foaming plastic mass. This temperature difference changes the vaporization rate of physical blowing agents such as CFC-11 or CFC-113 which has been mixed with and homogeneously compatibilized in a urethane stock solution, so that an outer portion of the foaming plastic mass which contacts the mold surface forms a high density outer surface layer, while an inner portion of the foaming plastic mass which is held out of contact with the mold surface has a cellular structure. As the reaction advances, the mold cavity is filled with foams or bubbles and the blowing pressure in the mold rises (This condition is generally called as an "overpacked" state or condition having an overpack factor ranging from 4 to 7 where overpack factor is the density ratio of a molded foam to a free-blowing foam). In this instance, gases trapped in those foams which are contacting the mold surface are condensed and then absorbed or recompatibilized in the reacting plastic mass. Thus, the high density outer surface layer is thickened.

In this condition, the foaming plastic mass is forced into rapid gelation (solidification of the flowable foaming plastic mass following a rapid rise in viscosity caused by polymerization). By this gelation, the shape of the high density outer surface layer and the inner relatively low density cellular layer is set. A urethane foam having a foam core and a high density outer surface layer is thus formed by a single foam molding operation of a same urethane stock solution. The conventional manufacture of such urethane foam article having a high density outer surface layer involves the consumption of CFC-11 or CFC-113.

Since CFC-11 and CFC-113 identified above, and HCFC-123 and HCFC-141b (HCFC=hydrochlorofluorocarbon) are halogenated hydrocarbon blowing agents including fluorine and chlorine, the consumption of these halogenated hydrocarbon blowing agents causes a breakage or destruction of the ozone layer in the stratosphere which will permit a great amount of detrimental ultraviolet rays to reach the ground of the earth. The detrimental ultraviolet rays bring about various serious problems against human beings, such as the mutation, deactivation and damaging of genes and cells, an increased number of cutaneous cancer, a change of the ecosystem, and the greenhouse effect resulting from an increase in the atmospheric temperature.

With the foregoing problems in view, there have been an increased demand for a technique which enables the production of a urethane foam having a high density outer surface layer either without using CFC-11, CFC-113, HCFC-123, or HCFC141b. Such technique may include (1) a production using physical blowing agents, and (2) a substituted formation of a thick high density outer surface layer by the in-mold coating process.

The foregoing techniques are not satisfactory in terms of the production due to the necessity of an additional heating process or a vacuuming process for replacing gases in a foam with air or nitrogen, a high toxicity of a gas involved and rust created thereby, and a high reconstruction cost of the manufacturing equipment. Furthermore, the foregoing techniques are also unsatisfactory in terms of the quality of the high density outer surface layer of resultant foams.

Through a concentrated research development, the present inventors have proposed processes for preparing a urethane foam with a high density skin layer which are capable of obviate the necessity of physical blowing agents, such as CFC-11 or CFC-113 by using a certain kind of catalyst in combination with a blowing agent consisting of water. These prior proposals are described in co-pending U.S. patent application Ser. Nos. 546,840 and 546,852 both filed Jul. 2, 1990.

In the production of a steering wheel grip made of a semi-rigid urethane foam with a high density outer surface layer or skin, it has been a conventional practice to formulate a plastic liquid by using a low-melting solvent such as chlorofluorocarbons (hereinafter referred to as physical blowing agents) as a blowing agent in combination with aromatic isocyanates, polyols, a catalyst, low-molecular polyols used as a cross-linker or a chain extender, a blowing agent, and an assistant such as a pigment or a foam stabilizer. The formulated plastic liquid has an average hydroxyl number ranging from 130 to 250 mg-KOH/g and generally from 140 to 190 mg-KOH/g. When the blowing agent is substituted by water or a water absorptive resin ("water absorptive resin" is used herein to refer to water absorbed in a water absorptive resin added in the formulations), and if the amount of water or the water absorptive resin added is determined so as to generate a same amount of gas while keeping the loadings of other components remain unchanged, the average hydroxyl number of the resultant plastic liquid goes up in the range of from 250 to 300 mg-KOH/g (even when a small difference in gas trapping factor is adjusted). With this large hydroxyl number, the resultant urethane foam has a relatively large hardness and relatively small elasticity and elongation which lead to a deterioration of physical properties of the urethane foams and lower the product value of the urethane foams.

In order to prevent deterioration of the physical properties of the urethane foam, the amount of low-molecular polyols used as a crosslinker or a chain extender is reduced in which instance, however, only an insufficient amount of reaction heat is generated, slowing-down the formation of a high density outer surface layer of the urethane foam. Alternatively, if the amount of water, water absorptive resin, or a mixture thereof is reduced so as to adjust the hydroxyl number of the plastic liquid in the range of from 140 to 190 mg- KOH/g, the extent of foaming of the plastic liquid and the amount of heat developed by reaction are reduced. As a consequent, a sufficient difference in reaction between an outer surface layer and an intermediate layer of the urethane foam cannot be created, failing to form a high density outer surface layer. In the case of a steering wheel grip, the difference in diameter between the steering wheel grip and a metal insert is small (about 3-7 mm), so that an outer surface layer and an intermediate layer of the steering wheel grip cannot be distinguished from one another depending on a difference in density.

As against the physical blowing process performed by the physical blowing agents such as fluorocarbons, a recondensation caused by an increase in blowing pressure within a closed mold is not expected. In the case of a chemical blowing process using water as a blowing agent, a high density outer surface layer is formed by gelation concurring with a rapid polymerization of the plastic liquid brought to an over-packed state as the foaming proceeds. The formation of the high density outer surface layer is largely influenced by sealing properties of the mold. When the mold has inaccurately finished vent holes or parting lines, a large amount of plastic liquid may flow out from the mold through these inaccurately finished portions. A molded urethane foam, therefore, has a relatively large amount of burrs, flashes, fins or vent mushrooms. When the burrs or the like are removed, the texture of an intermediate foam layer appears at the outside surface of the urethane foam, making the foam unsightly in appearance. The product value of the urethane foam is considerably lowered, accordingly.

Furthermore, the amount of heat developed solely by reaction of the plastic liquid is insufficient to create a temperature difference large enough to form a high density outer surface layer due to a difference in blowing reaction between the outer surface layer and the intermediate layer.

More specifically, will be described the above-mentioned prior practice used for the production of the steering wheel grip made of a urethane foam and having a high density outer surface layer. The blowing agent comprises the low blowing point solvents such as fluorocarbons, and the plastic liquid has an average hydroxyl number ranging from 130 to 250 mg-KOH/g, and generally from 140 to 190 mg-KOH/g, as described above. A liquid mixture for the plastic liquid is prepared by mixing 90 parts by weight of polyol (Sumiphen-3063 manufactured by Sumitomo Bayer Urethane Co., Ltd.), a crosslinker composed of 7-10 parts by weight of 1,4-butanediol (first grade reagent) or 6-8 parts by weight of ethylene glycol (first grade reagent), a blowing agent composed of 12-15 parts by weight of CFC-11 (DF-11 manufactured by Daikin Industries, Ltd.), a catalyst composed of 0.8-1.0 parts by weight of Dabco33LV (manufactured by Nihon Nyukazai Co., Ltd.). and 0.02-0.06 parts by weight of U-100 (manufactured by Nitto Kasei Co., Ltd.), a desired amount of pigment and a foam stabilizer, if necessary. The mixture is added to an aromatic polyisocyanate in the chemical equivalent weight ratio of from 1:1 to 1:1.05 and the resultant mixture is foamed in a closed mold, thereby making a urethane foam.

When CFC-11 is substituted in full amount by water, 1.7-2.0 parts by weight of water is needed for generating a corresponding amount of gas. Such a large amount of water brings about various deficiencies including a reduction of product value of the urethane foam and a deterioration of physical properties of the urethane foam, as described above. In order to overcome these deficiencies, the amount of low-molecular polyol used as a crosslinker or a chain extender, water or the water absorptive resin used as a blowing agent, or a mixture thereof is reduced. Such a change in amount of formulations of the plastic liquid, however, arises different problems such as insufficient formation of a high density outer surface layer due to a reduction of the extent of foaming and a reduction in amount of heat developed by reaction, as well as an increased amount of leakage of plastic liquid through vent holes or parting lines caused by a retarded cure time and a slowdown of polymerization.

SUMMARY OF THE INVENTION

Through a continued research about the problems arisen from a gas evolving catalyst and a blowing agent consisting of water used in prior art, the present inventors have found a novel process suitable for the mass-production of urethane foams having a high density outer surface layer.

The present invention relates to a process for producing a urethane foam having a high density outer surface layer, of the type wherein a plastic liquid containing aromatic isocyanates, polyols, a catalyst, low-molecular polyols used as a crosslinker or a chain extender, a blowing agent consisting of water, and an assistant is poured into a closed mold through a one-shot molding process. In one aspect the invention provides certain kinds of catalysts used for the formation of a high density outer surface layer and eliminates various deficiencies including a reduction in elongation and elasticity, an increase in hardness and a deterioration of other physical properties which would otherwise occur when water used as a blowing agent is adjusted so as to generate a certain amount of gas which is the same as the amount of gas generated by physical blowing agents such as CFC-11 or CFC-113.

An object of this invention is to provide a process for producing a urethane foam having a high density outer surface layer without using a blowing agent including a halogenated chlorofluorocarbon, in which novel catalysts other than those described in the co-pending Patent Application Ser. No. 546,840 filed Jul. 2, 1990.

Another object of the present invention is to provide a process for producing a urethane foam having a high density outer surface layer without using a blowing agent including a halogenated hydrocarbon containing chlorine and fluorine, which process is capable of overcoming various difficulties resulting from a deterioration of physical properties (a reduction of elongation and a sharp rise of hardness, in particular) and is also suited for the mass-production of urethane foams.

According to a process of this invention, a urethane foam having a high density outer surface layer is produced by foaming a foamable liquid mixture in the presence of a particular catalyst without using a blowing agent consisting of a halogenated hydrocarbon including fluorine and chlorine, such as CFC-11, CFC-113, HCFC-123 or HCFC-141b.

In a preferred form, the process of this invention includes a heat build-up agent which is capable of building up heat when chemically reacted with the isocyanates and is inactive as a crosslinker or a chain extender. By using the heat build-up agent as an assistant, a desired high density outer surface layer is formed on a urethane foam even when the amount of water and a crosslinker is reduced so as to avoid an undue reduction in elongation of the urethane foam and a sharp rise in hardness of the urethane form. Formation of the high density outer surface layer is stable even when the mold temperature increases or while the flowability of a foamable liquid mixture is controlled. This process is, therefore, particularly suitable for the mass-production of urethane foams.

The proportions of blowing agent consisting of water and the crosslinker can be adjusted in view of a hardness and wearability so as to provide a desired thickness.

The amount heat built-up during reaction process and the flowability of a foamable liquid mixture are adjusted by using the heat build-up agent in such a manner as to maintain the extent of foaming and the amount of reaction heat above certain levels. This adjustment obviates various difficulties such as insufficient formation of an integral skin layer caused by an insufficient amount of reaction heat and a reduced extent of foaming, and an increased amount of overflow from a vent hole or a parting line occurring due to a retarded cure time and a slowdown of polymerization.

The above and other objects, features and advantages of the present invention will become manifest to those versed in the art upon making reference to the detailed description and the accompanying sheet of drawing.

DETAILED DESCRIPTION OF THE INVENTION

Figure 1:
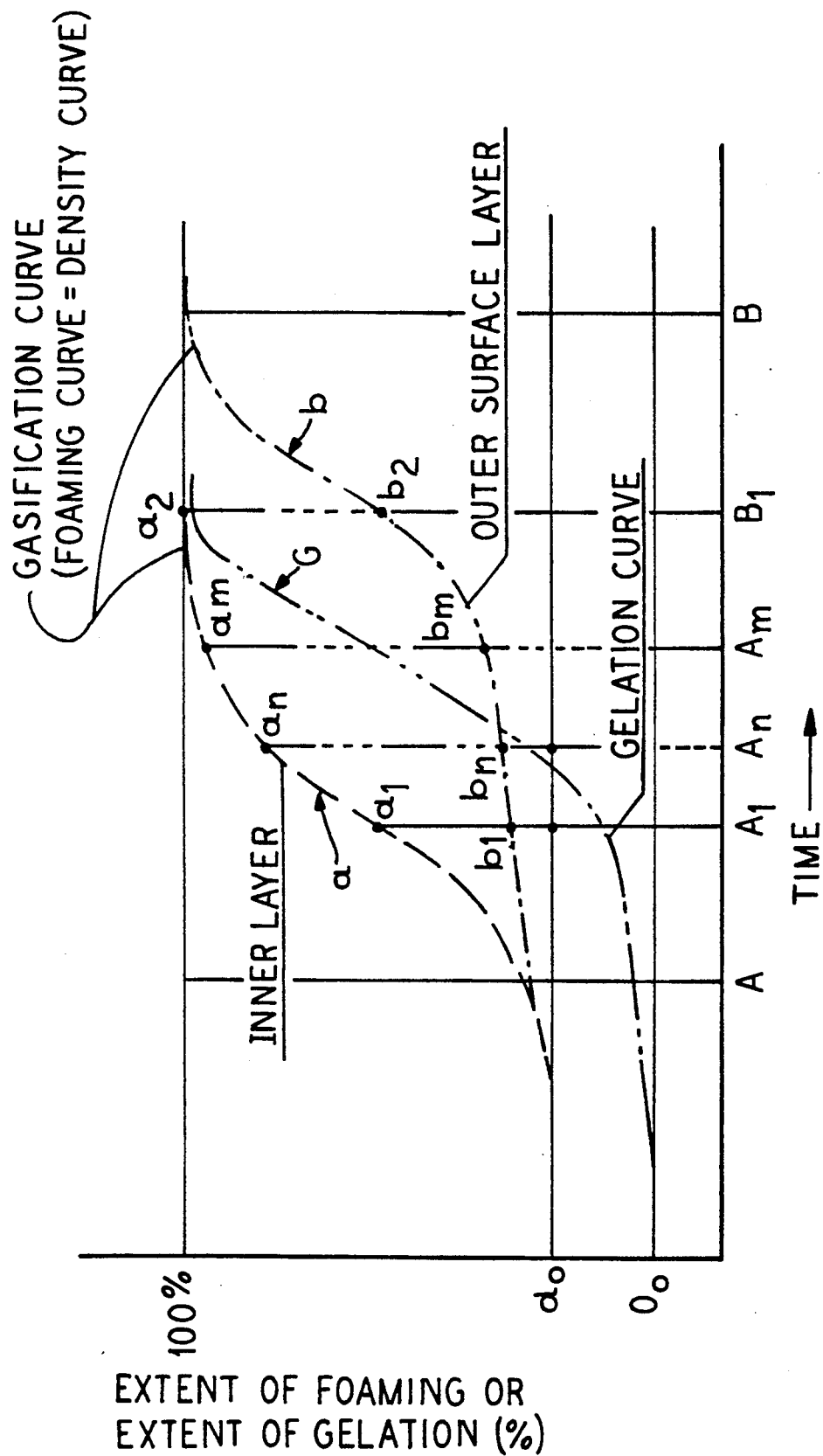
FIG. 1 is a graph showing the relationship between the extent of foaming of an outer portion of the urethane stock solution contacting a mold surface, the extent of foaming of an inner portion of the urethane stock solution held out of contact with the mold surface, and the extent of gelation of the urethane stock solution that are taken in conjunction with time.

The present invention relates to processes for producing a urethane foam having a high density outer surface layer, of the type wherein a plastic liquid containing aromatic isocyanates, polyols, a catalyst, low-molecular polyols used as a crosslinker or a chain extender, a blowing agent consisting of water, and an assistant is poured into a closed mold through a one-shot molding process.

The process of this invention for forming a high density outer surface layer of a urethane foam is theoretically described with reference to FIG. 1. As is apparent from FIG. 1 and points $a_1$ and $b_1$ and $a_2$ and $b_2$, in particular, an inner layer and an outer surface layer differ in their extent of foaming (the magnitude of blowing or the density) during a time period between point A and point B. If a foaming liquid is fully loaded or packed in a closed mold at any time during this time period and gelation by polymerization of the foaming liquid is completed as indicated by a gelation curve "G", at the time $B_1$ the density of the inner layer and the density of the outer surface layer are set at $a_2$ and $b_2$ values, respectively. Thus, the outer surface layer constitutes an integral layer having a density greater than that of the inner layer.

While keeping the differences in density between points $a_1$ and $b_1$ and between points $a_2$ and $b_2$, the mold is filled with the foaming liquid at any time during the time period between $A_1$ and $B_1$. In this instance, the foaming liquid thus loaded has a corresponding difference in density between the outer surface layer and the inner layer. Then the gelation by polymerization of the foaming liquid is completed. After a reactive plastic liquid (urethane stock solution) is poured into a mold, the mold is completely filled with the foaming liquid at a time when the following equation (1) holds between the volume equivalent to the respective extents of foaming $a_1$ and $b_1$ on the foaming curves a and b.

$$\text{Volume equivalent to } [a_0 + (a_1 - a_0) + (b_1 - a_0)] = \quad (1)$$

volume of a space in the mold where $a_0$ is the density of the plastic liquid (urethane stock solution) immediately after the pouring which is equivalent to zero level foaming.

When a desired time $A_n$ between point $A_1$ and point $B_1$ is selected, the respective foaming extents $a_n$ and $b_n$ of the inner layer and the outer surface layer are obtained from the foaming curves a and b. In this instance, the amount of plastic liquid (urethane stock solution) to be poured into the mold can be determined in such a manner that the following equation (2) holds.

$$\text{Volume equivalent to } [a_0 + (a_n - a_0) + (b_n - a_0)] = \quad (2)$$

volume of a space in the mold

The gel time of the foaming liquid fully pecked in the mold is determined by an appropriate adjustment of the reactivity of the plastic liquid (urethane stock solution) so that the gelation based on polymerization is completed while keeping the difference in density at a desired time selected from a time period $A_n$-$B_1$.

The difference in density created after pouring of the plastic liquid (urethane stock solution) is obtained by $a_1$-$b_1$ provided that the mold cavity is filled due to initial foaming of the plastic liquid at the time $A_1$. Since the foaming of the inner layer further proceeds rapidly under heat generated and stored by the exothermic reaction, as compared to the outer surface layer, the blowing pressure in the mold goes up rapidly. With this rapid pressure rise, and additionally due to the thermal conduction to the mold which is previously maintained at a low temperature, the foaming of the outer surface layer is restricted to an unfoamed or low-foaming condition. Under such condition, the gelation based on polymerization of the foaming liquid is completed at a time $A_m$ of the time period $A_n$-$B_1$, thus obtaining a difference in density $a_m$-$b_m$. If $A_m=B_1$, the inner layer and the outer surface layer are set at respective densities of $a_2$ and $b_2$. As seen from FIG. 1, the outer surface layer thus formed is an integral layer of a higher density than the inner surface layer.

In one aspect the invention provides a process in which a blowing agent consists of water alone and a catalyst composed of a piperazine compound are used for causing the isocyanates and the blowing agent to create a difference in gas evolving reaction between an inner part and an outer part of the plastic liquid within the mold, thereby forming a high density layer on the outer surface of a urethane foam. The piperazine compound is at least one selected from the group consisting of methylhydroxypiperazine, trimethylaminoethylpiperazine, bis[2-(4-methylpiperazinyl)ethyl]ether, and 1-methyl-4'-(dimethylaminoethyl)piperazine. Piperazine compounds which are commercially available include ToyoCAT-HP, TolyCAT-HPW or ToyoCAT-NP manufactured by Tosoh Co., Ltd., U-CAT 2050 manufactured by San-Apro Limited, or KAOLIZER manufactured by Kao Corporation.

To the plastic liquid, a heat build-up agent may be added. The heat build-up agent is capable of building up heat when chemically reacted with the isocyanates and is inactive as a crosslinker. The heat build-up agent comprises ethanol, a monoamine, or a mixture thereof. The monoamine is a primary amine or a secondary amine which is a derivative of $NH_3$ in which there is a replacement for one or two of the H atoms of $NH_3$ by an alkyl group, the monoamine being at least one selected from the group consisting of n-butylamine(1-aminobuthane), N-dibutylamine, pentylamine(n-amylamine, 1-aminopenthane), and dipentylamine(di-n-amylamine).

Function of the heat build-up agent will be described below in greater detail. When a formulation containing a blowing agent consisting of water or a water absorptive resin, and a crosslinker is used, the resultant foam has a larger hardness and a lower elasticity due to an increase in amount of water as compared to a foam produced from a formulation in which physical solvents such as fluorocarbons is used as a blowing agent. Thus, the physical properties and product value of the foam are deteriorated.

Taking this difficulty into account, the amount of water or water absorptive resin may be reduced, or alternatively the amount of low-molecular polyols used as a cross-linker or a chain extender may be reduced. As a further alternative, a reduced amount of water or water absorptive resin may be used in combination with a reduced amount of low-molecular polyols. In either case, however, the amount of heat developed during reaction of the plastic liquid descends, leading to a reduction of extent of foaming and a reduction of reaction heat. Under these circumstances, only an insufficient reaction difference is created between the outer surface layer and the inner layer of a foam, so that a high density outer surface layer which is distinctive in texture from the inner layer is difficult to form. In addition, due to a retarded cure time and a slowdown of polymerization, an increased amount of plastic liquid overflows from a vent hole or a parting line.

With the foregoing problems in view, 0.2–10 parts by weight of a heat build-up agent prepared as defined above is added to the plastic liquid. The heat build-up agent thus added increases the amount of heat developed during the reaction of the plastic liquid and promotes polymerization of the plastic liquid. A combination of the promoted polymerization with a rapid reaction of the heat build-up agent brings about a sharp rise in viscosity of the plastic liquid which creases, between the outer surface layer and the inner layer of a foam being produced, a difference in reaction large enough to form a desired high density outer surface layer. The heat build-up agent as added to the plastic liquid reacts with isocyanates at high speeds and develops a sufficient amount of heat which can compensate for a potential reduction of heat involved in the plastic liquid using a blowing agent composed of water or a water absorptive resin.

A desired high density outer surface layer can be formed by increasing the temperature of a mold even when water or the water absorptive resin is used as a blowing agent. Since the temperature of the overall reaction system is increased by the action of heat build-up agent, the mold temperature can be increased to such an extent that a high density skin layer is formed on the outside surface of a foam.

The heat build-up agent further enables a free control of the amount of plastic liquid overflowing from the mold through a vent hole or a parting line (in the form of burrs, flashes, etc.). Since the heat build-up agent rapidly reacts with isocyanates contained in the plastic liquid and thereby develops heat, the polymerization and the resulting gelation of the plastic liquid are promoted, so that the flowability of the plastic liquid is controllable freely. The overflow of the plastic liquid from the vent hole or the parting line can, therefore, be controlled.

The temperature of the mold is in the range of from 15° to 45° C., preferably from 20° to 35° C. This mold temperature is considerably lower than the mold temperature of from 45° to 60° C. which is required in a process using physical blowing agents such as CFC-11. The temperature of the plastic liquid preferably is in the range of from 15° to 30° C. A plastic liquid to which the heat build-up agent is added is homogeneously mixed by stirring and then pored into a mold kept at a temperature within the above-mentioned range. In this instance, the plastic liquid is conditioned at the temperature stated above. With this temperature control, foaming of the plastic liquid is retarded in the vicinity of the inside surface of the mold, while an inner part of the plastic liquid held out of contact with the mold surface is allowed to foam and start to gel under heat produced during the exothermic reaction. This causes a rapid increase in the blowing pressure in the mold which will create a so-called "overpacked" condition. Under such overpacked condition, the gelation occurs rapidly with a further inhibition of the foaming of the outer part of the plastic liquid, thus forming a high density outer surface layer.

The blowing agent comprises water used alone or in combination with a finely-powdered water absorptive resin such as isobutylene, a maleic anhydride copolymer such as a product commercially available as KI Gel 201K-F2 from Kuraray Co., Ltd., an acrylic vinyl alcohol copolymer such as a product commercially available as SP-520 from Sumitomo Chemicals Industries Ltd., or an acrylic sodium carbonate polymer such as a product commercially available as NP-1010 from Sumitomo Chemical Industries Ltd. In the latter instance, 0.5–10 parts by weight of such finely-powdered water absorptive resin is added as an effective component to polyol component. The water absorptive resin thus added swells to absorb a large amount of water and retards the reaction between isocyanates and water, hence is attributive to the formation of a urethane foam article having a high density outer surface layer for the reasons described below. The high water absorptive resin is a polyelectrolyte which is capable of absorbing water more than several ten times to one thousand times as much as its own weight. Due to an osmotic pressure created by the salt effect of functional groups such as carboxylic sodium carbonate contained in its structure and a strong affinity between water and the polyelectrolyte, the water absorptive resin absorbs water rapidly and forms a hydrogel.

More specifically, a water absorbing mechanism of the acrylic vinyl alcohol copolymer will be described. Since the acrylic vinyl alcohol copolymer has a structure composed of chains of ionic water soluble electrolytic polymer loosely linked together, the water absorbing mechanism comprises an ionic network of polyelectolyte, movable ions of the opposite polarity, and water retained in the ionic network. When the acrylate phase swells, the polyvinyl alcohol phase is stretched or otherwise crystallized under orientation, thereby forming a complex structure in which the polyacrylate portion saturated with water is supported by the crystallized polyvinylalcohol portion.

In the case where the water absorptive resin is used in combination with water, it is preferred that a mixture of a primary component composed of isocyanates, a secondary component composed of polyols, water and/or a water absorptive resin, a foam stabilizer, a pigment, and a crosslinker is homogeneously stirred before the pouring and such a homogeneous stirring is performed instantaneously.

In another aspect, the present invention provides a process in which the above-mentioned piperazine compound is used as a catalyst in combination with an imidazole compound, a triazine compound, an amidine compound or an organic acid salt of the amidine compound, or a mixture resulting from any combination thereof.

The imidazole compound is an imidazole ether compound, a 1-substituted imidazole compound, or a mixture thereof. The imidazole ether compound is 1,1'-(oxydiethylene)bis(2-methyl-imidazole, or 1,1'-(oxydiethylene)bis (imidazole), as disclosed in Japanese Patent Laid-open Publication No. 2-160768. The 1-substituted imidazole compound is 1-methylimidazole, 1-ethylimidazole, 1-propylimidazole, 1-butylimidazole, 1,2-dimethylimidazol, or 1-ethyl-2-methylimidazole. It may be possible to other imidazole compound such as 2-methylimidazole, 2-ethyl-4-methylimidazole and 2-ethylimidazole.

Among these imidazole compounds, 1,2-dimethylimidazol, 1,1'-(oxydiethylene)bis(2-methyl-imidazole, 2-ethyl-4-methylimidazole, 2-ethylimidazole, and 2-methylimidazole are preferable. The imidazole compounds are commercially available except 1,1'-(oxydiethylene)bis(2-methyl-imidazole. The commercially available products are U-CAT 2026 and U-CAT 2030 both manufactured by San-Apro Limited, Curesole 2MZ, Curesole 2E4MZ and Curesole 2EZ all manufactured by Shikoku Kasei Industries Co., Ltd. The imidazole compounds may be used separately or in combination. They may be used in combination with a catalyst composed of a triazine compound, an amidine compound, an organic acid salt of the amidine compound, the piperazine compound, or a mixture thereof.

The triazine compound used as a catalyst is at least one selected from the group consisting of N,N',N''-tris (dimethylaminopropyl)hexahydro-S-triazine, an organic acid salt of the N,N',N''-tris(dimethylaminopropyl)hexahydro-S-triazine, and a mixture thereof. Triazine compounds are commercially available as PolyCat 41 and PolyCAT 42 both manufactured by Air Products and Chemicals Inc. and sold by San-Apro Limited.

The amidine compound used as a catalyst is at least one selected from the group consisting of 1,8-diazabicycro(5,4,0)-7-undecene and an organic acid salt of thereof. The amidine compound may be a product commercially available as DBU; U-CAT SA1, U-CAT SA102, U-CAT SA106, U-CAT SA 109, U-CAT SA506, or U-CAT SA603 all manufactured by San-Apro Limited.

When one or more of the foregoing compounds are used as a catalyst, the function of a heat build-up agent, the temperature of a mold used, and the temperature of a plastic liquid are the same as described above.

The ratio of the 1-substituted imidazole compound to the 1,8-diazabicyclo(5,4,0)-7-undecene or the organic acid salt thereof is 1:0.5–1:1.5, and preferably 1:0.7–1:1.2.

The amount of the catalyst used for the formation of a semi-rigid urethane foam having a high density outer surface layer is in the range of from 0.3 to 3.0 parts by weight, and preferably from 0.6 to 1.8 parts by weight per 100 parts by weight of the polyol component.

The above-mentioned catalysts may be used in combination with known catalysts. Examples of such known catalysts include an amine family catalyst and a tin family catalyst. The amine family catalyst is selected from the group consisting of 1,4-diazabicyclo(2,2,2)octane, N,N,N',N'-tetramethylhexamethylenediamine, N,N,N-tris(dimethylaminopropyl)amine, N-methyl-N,N-bis(dimethylaminopropyl)amine, and N-methyl-dicycrohexylamine. The tin family catalyst is dibutyltin dilaurate or atannous octoate.

When the known catalyst is used in combination with any of the inventive catalysts, the ratio of the inventive catalyst to the known amine family catalyst is 1:0.1–1:1.5, and preferably 1:0.3–1:0.7. The ratio of the inventive catalyst to the known tin family catalyst is 1:0.01–1:0.1, and preferably 1:0.01–1:0.05.

The above-mentioned catalyst or catalysts are used in combination with a blowing agent consisting of water alone. In this instance, the mold temperature is maintained at a temperature within a range of from 15° to 45° C., and preferably from 20° to 35° C. which is considerably lower than the mold temperature in the conventional process utilizing physical blowing agents such as CFC-11. The plastic liquid is homogeneously mixed by stirring and conditioned at a temperature around 25° C.

In the case where a urethane foam having a semi-rigid high density outer surface layer is to be produced, the plastic liquid is conditioned at a temperature of 15°–35°, and preferably 20° C.±3° C. and homogeneously mixed by stirring before it is pored into a mold.

With this temperature control, foaming of the plastic liquid is retarded in the vicinity of the inside surface of the mold, while an inner part of the plastic liquid held out of contact with the mold surface is allowed to foam and start to gel under heat produced during the exothermic reaction. This causes a rapid increase in the blowing pressure in the mold which will create a so-called "overpacked" condition. Under such overpacked condition, the gelation occurs rapidly with a further inhibition of the foaming of the outer part of the plastic liquid, thus forming a high density outer surface layer.

When a thinner high density outer surface layer is desired, the preparation temperature of the plastic liquid (urethane stock solution) used is increased from 20° C.±3° C. toward 30° C. Further, the density of the outer surface layer is to be lowered, the temperature of the mold is increased from 20° C.±5° C. toward 40° C. until an outer surface layer of a desired density is obtained. Optimum conditions may be previously determined by experiments. The foregoing temperature controlling conditions may be varied concurrently with a charge in the amount of the gas evolving substance (blowing agent) added.

In still another aspect, the invention provides a process in which the above-mentioned piperazine compound is used as a catalyst in combination with a morpholine compound. The morpholine compound is at least one selected from the group consisting of 4(N,N-dimethylaminopropyl)2,6-dimethylmorpholine, N-metylmorpholine, and N-ethylmorpholine. The morpholine compound is commercially available as U-CAT 2044 manufactured by San-Apro Limited, KAOLIZER No. 21 or KAOLIZER No. 22 manufactured by Kao corporation . The above-mentioned morpholine compounds may be used in combination an imidazole compound, a triazine compound, an amidine compound or an organic acid salt of said amidine compound, or a mixture resulting from any combination thereof. In this case, the heat build-up stated above may be used. In addition, the mold temperature and the plastic liquid temperature may be controlled as described above.

Polyols used in this invention include all those known to the art. Examples of such known polyols include polyetherpolyol having a structure including alkylene oxide (ethylene oxide, propylene oxide, etc) added to a low-molecular polyol (ethylene glycol, propylene glycol, glycerin, trimethylolpropane, triethanolamine, pentaerythritol, sorbitol, cane sugar, etc) and polyamine (ethylenediamine, diethylentriamine, tolylenediamine, xylylenediamine, piperazine, N-aminoalkylpiperazine, cyclohexylenediamine, etc), polymer polyol (disclosed for example in U.S. Pat. No. 3,383,351) obtained by reacting polyetherpolyol with ethylenic unsaturated monomer (acrylonitrile, styrene, methyl methacrylate, butadiene, etc.), and polyesterpolyol obtained by reacting polycarboxylic acid (succinic acid, maleic acid, sebacic acid, adipic acid, fumaric acid, phtalic acid, dimer acid, etc) with the above-mentioned low-molecular polyol.

Among these polyols, a polyol which is suitable for the formation of a semi-rigid urethane foam having a high density outer surface layer is polyetherpolyol including ethylene oxide added to the end group of polypropylenepolyol added with polypropylene oxide such as di-to tri-functional propylene glycol, glycerin and trimethylolpropane, or polymer polyol derived from the reaction involving acrylonitrile or vinylbenzene. These polyols may be used separately or in combination. The foaming liquid (urethane stock solution) generally comprises 25-60 parts by weight of isocyanates, 2-20 parts by weight of a crosslinker, 0.5-3 parts by weight of a blowing agent, 0.3-3.0 parts by weight of a catalyst, and 2-10 parts by weight of an assistant per 100 parts by weight of polyols.

Isocyanates used in the present invention are conventional per se. Eligible isocyanates include aromatic polyisocyanate (tolylenediisocyanate, diphenylmethanediisocyanate, etc), aliphatic polyisocyanate (hexamethylenediisocyanate, isophoronediisocyanate, etc.), denatured aromatic polyisocyanate (carbodiimide modified, isocyanurate modified, etc.), and prepolymer containing free isocyanate obtained by reacting polyfunctional active hydrogen compound with the above-mentioned aromatic polyisocyanate, aliphatic polyisocyanate or denatured aromatic polyisocyanate. These isocyanates may be used separately or in combination.

The amount of isocyanates used is determined depending on the type of the polyol used, the type and amount of the crosslinker to be added, the amount of the blowing agent (gas evolving substance), and the type of the isocyanate used. In general, the amount of isocyanates is in the range of 25-80 parts by weight, and preferably 30-50 parts by weight, per 100 parts by weight of the polyol component.

Eligible materials for the crosslinker may include low-molecular polyols such as triethanolamine, diethanolamine or the like amino low-molecular polyol, ethylene glycol, diethylene glycol, butanediol, trimethylolpropane, and glycerin. In addition, those low-molecular polyesterpolyols which have an average functionality of 2.0-3.0, a hydroxyl number of 300-1900 mg-KOH/g, and an acid value not exceeding K-OH 2.0 mg/g may be used. Furthermore, low-molecular polyeterpolyols having a hydroxyl number of 300-1900 mg-KOH/g and obtained under such a condition that the additive weight ratio of ethylene oxide to propylene oxide is not less than 7:3. These low-molecular polyols may be used separately or in combination.

The amount of the crosslinker in this invention varies depending on the type of a crosslinker used. In the case of the formation of a semi-rigid urethane foam having a high density outer surface layer, the amount of the low-molecular polyol is in the range of 2-20 parts by weight, and preferably 3-10 parts by weight per 100 parts by weight of the conventional polyol component. To the polyol, an organic silicone foam stabilizer may be added if necessary. In the manufacture of the urethane foam article according to the invention, an emulsifying agent, a stabilizer, a foam stabilizer composed of a surfactant, a filler, a colorant, an oxidative stabilizer and any other assistant may be used, if necessary. Furthermore, though not intended by the invention, a low-boiling point solvent may be used as a blowing agent in combination with the gas evolving substances described above.

The urethane foam with a high density outer surface layer may be produced by a conventional molding process such as the so-called "open molding" wherein a homogeneously mixed urethane plastic liquid is poured into a mold with a top cover open and, immediately after the pouring, the mold is closed by the top cover. As an alternative, a reaction injection molding of the so-called "closed molding" type may be used in which components of a urethane plastic liquid are mixed up with each other as they flow through film gates and a sprue in a closed mold and the homogeneously mixed urethane plastic liquid is subsequently injected into the closed mold.

EXAMPLES

For a better understanding of the present invention, the following examples are provided.

INVENTIVE EXAMPLE 1

A first liquid mixture was prepared by mixing 94 grams of tri-functional polyetherpolyol (Sumiphen-3063; OHV-28 mg-KOH/g manufactured by Sumitomo Bayer Urethane Co., Ltd.) and 6 grams of ethylene glycol (first grade reagent) as polyols, 0.3 grams of a silicone foam stabilizer (L-5305 manufactured by Nippon Unicar Co., Ltd.) as a foam stabilizer, 1.95 grams of distilled water as a blowing agent, and a catalyst composed of 0.6 grams of U-CAT 2044, 0.6 grams of U-CAT SA1 as catalysts (Inventive Example 1-(1)). A second liquid mixture was also prepared by replacing the catalysts of the first liquid mixture with 0.7 grams of KOALIZER and 0.7 grams of U-CAT 2030 (Inventive Example 1-(2)). To each of the first and second mixtures maintained at 20° C., 64.3 grams of crude MDI (MDI-CR-200 manufactured by Mitsui Toatsu Chemicals, Inc.) conditioned at a temperature of 20° C. was added as isocyanates, and immediately thereafter the resultant mixture was homogeneously mixed by a homomixer for 6 seconds. Each respective homogeneous mixture thus obtained was immediately poured into an aluminum mold with a lockable cover or lid of 20 mm thick (effective space size=10 mm in thickness×160 mm in width×150 mm in length). The lid of the mold was then closed and clamped to withstand the blowing pressure. After the poured mixture was allowed to stand for 10 minutes, the lid was opened and a foamed article was removed from the mold. The foamed article was cut across the thickness thereof for observation of the cross section of the foamed article. The observation indicated that the foamed article resulting from the first mixture was a semi-rigid urethane foam having a homogeneous finely-divided cellular structure with an adequately formed high density outer surface layer of 1.5 mm in average thickness. The foamed article obtained from the second mixture was a semi-rigid urethane foam having a homogeneous finely-divided cellular structure with an adequately formed high density outer surface layer of 1.3 mm in average thickness. Properties of the urethane foams thus obtained are shown in Table 1.

TABLE 1

|  | Inventive Example | |
| --- | --- | --- |
|  | 1-(1) | 1-(2) |
| Average Thickness of High Density Layer (mm) | 1.5 | 1.3 |
| Total Average Density $(g/cm^3)$ | 0.498 | 0.510 |
| Density of High Density Layer $(g/cm^3)$ | 0.754 | 0.730 |
| Density of Inner Foam Layer $(g/cm^3)$ | 0.453 | 0.470 |
| Hardness JIS-C Type (S-6050) | 94 | 96 |

Reacting properties of the liquid mixtures used for the pouring into the mold are shown in Table 2.

TABLE 2

|  | Inventive Example | |
| --- | --- | --- |
|  | 1-(1) | 1-(2) |
| Cream Time (second) | 32 | 20 |
| Rise Time (second) | 69 | 58 |
| Tack-free Time (second) | 90 | 65 |

COMPARATIVE EXAMPLES 1 AND 2

For comparative purposes, two foam articles were prepared by using a conventional physical blowing agent CFC-11 in combination with a mold maintained at 20° C. (Comparative Example 1) and with the same mold maintained at 55° C. (Comparative Example 2).

A liquid mixture maintained at 20° C. was prepared by mixing 94 grams of tri-functional polyetherpolyol (Sumiphen-3063; OHV-28 mg-KOH/g manufactured by Sumitomo Bayer Urethane Co., Ltd) and 6 grams of ethylene glycol (first grade reagent) as polyols, 0.5 grams of a silicone foam stabilizer (L-5305 manufactured by Nippon Unicar Co., Ltd.) as a foam stabilizer, 15 grams of a physical/blowing agent CFC-11 (Asahi-flon-11 manufactured by Asahi Glass Company) as a blowing agent, and 0.6 grams of Dabco-33LV (manufactured by Sankyo Air Products Co., Ltd.) in combination with 0.02 grams of U-100 (manufactured by Nitto Kasei Co., Ltd.) as a catalyst. To the liquid mixture maintained at 20° C., 33.8 grams of crude MDI (MDI-CR-200 manufactured by Mitsui Toatsu Chemicals, Inc.) conditioned at 20° was added as isocyanates, and immediately thereafter the resultant mixture was homogeneously mixed up by a homomixer for 6 seconds. The homogeneous mixture thus obtained was immediately poured into two molds which were the same as that used in Inventive Example 1 but different therefrom in that one mold for Comparative Example 1 was maintained at 20° C. while the other mold for Comparative Example 1 was at 55° C. The lid of each mold was then closed and clamped so as to withstand the blowing pressure. After the poured mixture was allowed to stand for 10 minutes, the lid was opened and a foamed article was removed from the mold. The foamed article obtained in each of the Comparative Examples 1 and 2 was cut across the thickness thereof for observation of the cross section of the foamed article. The observation indicated that the foamed article obtained by the Comparative Example 1 (in which the mold temperature was maintained at 20° C.) was totally unacceptable as a final product because the outer surface layer was sticky and had coarse cells providing an appearance of frost columns. The foamed article obtained by the Comparative Example 2 (in which the mold temperature was maintained at 55° C.) had the properties shown in Table 3.

TABLE 3

| Total Average Density $(g/cm^3)$ | 0.48 |
| --- | --- |
| Density of High Density Layer $(g/cm^3)$ | 0.73 |
| Density of Inner Foam Layer $(g/cm^3)$ | 0.40 |
| Hardness JIS-C Type (S-6050) | 70 |

Reacting properties of the liquid mixture used for the pouring into the respective molds is shown in Table 4.

TABLE 4

| Mold Temperature | 20° C. | 55° C. |
| --- | --- | --- |
| Cream Time (second) | 12 | 10 |
| Rise Time (second) | 48 | 43 |
| Tack-free Time (second) | 57 | 50 |

As noted above, the article obtained by Comparative Example 2 in which the mold temperature was maintained at 55° C. was a semi-rigid urethane foam article having an adequately formed high density outer surface layer, as comparable to the foam article obtained by the Inventive Example 1.

INVENTIVE EXAMPLE 2

Three foam articles were prepared from three mixtures using the procedure set forth in Inventive Example 1 except that 0.5 grams of U-CAT 2030 and 1.0 grams of ToyoCAT-NP were added as a catalyst to a first mixture (Inventive Example 2-(1)); 0.5 grams of U-CAT 2044 and 0.5 grams of ToyoCAT-HPW were added as a catalyst to a second mixture (Inventive Example 2-(2)); and 0.7 grams of U-CAT 2050 and 0.8 grams of U-CAT 2030 were added to a third mixture (Inventive Example 2-(3)). Each of the foam articles was then cut across the thickness thereof for observing the cross section of the foam article. The observation indicated that as in the case of the Inventive Example 1, the foamed articles were semi-rigid urethane foams having a homogeneous cellular structure with a high density outer surface layer of 1.2-1.5 mm average thickness. The foams were characterized as shown in Table 5.

TABLE 5

|  | Inventive Example | | |
|---|---|---|---|
|  | 2-(1) | 2-(2) | 2-(3) |
| Total Average Density (g/cm³) | 0.38 | 0.48 | 0.45 |
| Density of High Density Layer (g/cm³) | 0.65 | 0.71 | 0.68 |
| Density of Inner Foam Layer (g/cm³) | 0.32 | 0.41 | 0.43 |
| Hardness JIS-C Type (S-6050) | 93 | 96 | 94 |

Reacting properties of the liquid mixtures used for the pouring into the mold are shown in Table 6.

TABLE 6

|  | Inventive Example | | |
|---|---|---|---|
|  | 2-(1) | 2-(2) | 2-(3) |
| Cream Time (second) | 12 | 31 | 12 |
| Rise Time (second) | 32 | 90 | 39 |
| Tack-free Time (second) | 35 | 95 | 45 |

As noted above, each of the articles obtained by the Inventive Example 2-(1) through 2-(3) was a semi-rigid urethane form having an adequately formed high density outer surface layer.

COMPARATIVE EXAMPLE 3

For comparative purposes, two foam articles were prepared using conventional catalysts such as Dabco 33 LV, U-100 and PolyCAT9 (manufactured by Air Products and Chemicals, Inc. and sold by San-Apro Limited) in combination with a mold maintained at 55° C. (Comparative Examples 3-(1) and 3-(2)). In that instance, a conventional physical blowing agent such as CFC-11 or CFC-113 was not used. Formulations for the foam articles of Comparative Example 3 are shown in Table 7. Table 8 shows various properties of the foam articles produced by Comparative Example 3.

TABLE 7

| Formulation | Example 3-(1) | Example 3-(2) |
|---|---|---|
| Blend A (gram) | | |
| Sumiphen-3063 | 94.0 | 94.0 |
| Ethylene Glycol | 6.0 | 6.0 |
| L-5305 | 0.3 | 0.3 |
| Dabco 33 LV | 0.5 | 0.6 |
| U-100 | 0.01 | — |
| PolyCAT-9 | — | 0.6 |
| U-CAT 2030 | — | — |
| Curesole 2E4MZ | — | — |
| U-CAT SA1 | — | — |
| Distilled Water | 1.95 | 1.95 |
| Blend B (gram) | | |
| MDI-CR-200 | 64.3 | 64.3 |
| Mold Temperature (°C.) | 55 | 55 |

TABLE 8

|  | Comparative Example | |
|---|---|---|
|  | 3-(1) | 3-(2) |
| Average Thickness of High Density Layer (mm) | thin skin less than 0.1 | thin skin less than 0.1 |
| Total Average Density (g/cm³) | 0.480 | 0.483 |
| Density of High Density Layer (g/cm³) | — | — |
| Density of Inner Foam Layer (g/cm³) | 0.474 | 0.478 |
| Hardness JIS-C Type (S-6050) | 73 | 73 |

As is apparent from FIG. 8, the conventional catalysts failed to form a high density outer surface layer. Reacting properties of the formulation were as shown in FIG. 9.

TABLE 9

|  | Comparative Example | |
|---|---|---|
|  | 3-(1) | 3-(2) |
| Cream Time (second) | 9 | 8 |
| Rise Time (second) | 62 | 56 |
| Tack-free Time (second) | 85 | 77 |

INVENTIVE EXAMPLE 3

Foam articles were prepared by using the conditions and procedure set forth in Inventive Example 1 except that a morpholine compound U-CAT 2044 (manufactured by San-Apro Limited), piperazine compounds ToyoCAT-NP and ToyoCAT-HPW (both manufactured by Tosoh Co., Ltd.), an imidazole compound U-CAT 2030 (manufactured by San-Apro Limited), and an amidine compound U-CAT SA1 (manufactured by San-Apro Limited) were used as catalysts, in combination with a isocyanate conditioned at 20° C. and composed of crude MDI (PAPI-135 manufactured by Mitsubishi Kasei Dow Co., Ltd.) and also with water absorptive resins saturated with water composed of KIgel-20K-F2 (manufactured by Kuraray Co., Ltd.) and NP-1010 (manufactured by Sumitomo Chemical Industries, Ltd.), in preparation of first, second and third components, as tabulated in Tables 10 and 11. The foam articles produced were cut across the thickness thereof for observation of the cross-sectional construction of the same. The observation indicated that the form articles were homogeneous semi-rigid urethane foam having a 1.0–1.5 mm high density outer surface layer, as in the case of Inventive Example 1.

Properties of the urethane foams thus obtained are also shown in Tables 10 and 11. As shown in Tables 10 and 11, the catalysts used in Inventive Examples 3-(1), 3-(2) and 3-(3) are a mixture of a piperazine and an imidazole, a mixture of piperazine and a morpholine, and a mixture of a piperazine and an amidine, respectively. Inventive Examples 3-(4), 3-(5) and 3(6) correspond to Inventive Examples 3-(1), 3-(2) and 3-(3), respectively with the exception that a water absorptive resin saturated with water is used additionally.

TABLE 10

|  | Inventive Example | | |
|---|---|---|---|
|  | 3-(1) | 3-(2) | 3-(3) |
| First Component (gram) | | | |
| Sumiphen-3063 | 84.0 | 84.0 | 84.0 |
| ethylene glycol (first grade reagent) | 6.0 | 6.0 | 6.0 |
| Distilled Water | 1.95 | 1.95 | 1.95 |
| Foam Stabilizer L-5305 | 0.3 | 0.3 | 0.3 |
| KIgel-201K-F2 | | | |
| NP-1010 | | | |
| Second Component (gram) | | | |
| U-CAT 2030 | 0.5 | | |
| U-CAT 2044 | | 0.5 | |
| U-CAT SA1 | | | 0.5 |
| ToyoCAT-NP | 1.0 | | 1.0 |
| ToyoCAT-HPW | | 1.0 | |
| Suimphen-3063 | 1.0 | 1.0 | 1.0 |
| Third Component (gram) | | | |
| PAPI-135 | 63.2 | 63.2 | 63.2 |
| Free Foaming Reactivity | | | |
| Cream Time (sec.) | 12 | 31 | 12 |
| Rise Time (sec.) | 32 | 90 | 32 |
| Tack-free Time (sec.) | 35 | 95 | 35 |

TABLE 10-continued

| | Inventive Example | | |
|---|---|---|---|
| | 3-(1) | 3-(2) | 3-(3) |
| Free Core Density (g/cm$^3$) | 0.060 | 0.056 | 0.077 |
| Test Piece Foaming | | | |
| Product Weight (g.) | 97 | 122 | 120 |
| Total Average Density (g/cm$^3$) | 0.384 | 0.483 | 0.476 |
| Cover Pack Factor (%) | 6.40 | 8.63 | 6.18 |
| Volume Ratio | 1.043 | 1.043 | 1.043 |
| Average Thickness of High Density Outer Layer (mm) | 1.2 | 1.0 | 1.5 |
| Density of High Density Outer Layer (g/cm$^3$) | 0.608 | 0.729 | 0.740 |
| Density of Inner Foam Layer (g/cm$^3$) | 0.313 | 0.421 | 0.362 |
| Cellular structure | fair | fair | fair |
| Hardness JIS-C Type (S-6050) | 93 | 96 | 94 |

TABLE 11

| | Inventive Example | | |
|---|---|---|---|
| | 3-(4) | 3-(5) | 3-(6) |
| First Component (gram) | | | |
| Sumiphen-3063 | 84.0 | 84.0 | 84.0 |
| ethylene glycol (first grade reagent) | 6.0 | 6.0 | 6.0 |
| Distilled Water | 1.95 | 1.95 | 1.95 |
| Foam Stabilizer L-5305 | 0.3 | 0.3 | 0.3 |
| KIgel-201K-F2 | 2.0 | 2.0 | |
| NP-1010 | | | 2.0 |
| Second Component (gram) | | | |
| U-CAT 2030 | 0.5 | | |
| U-CAT 2044 | | 0.5 | |
| U-CAT SA1 | | | 0.5 |
| ToyoCAT-NP | 1.0 | | 1.0 |
| ToyoCAT-HPW | | 1.0 | |
| Sumiphen-3063 | 1.0 | 1.0 | 1.0 |
| Third Component (gram) | | | |
| PAPI-135 | 63.2 | 63.2 | 63.2 |
| Free Foaming Reactivity | | | |
| Cream Time (sec.) | 19 | 40 | 20 |
| Rise Time (sec.) | 63 | 135 | 70 |
| Tack-free Time (sec.) | 70 | 150 | 80 |
| Free Core Density (g/cm$^3$) | 0.058 | 0.053 | 0.072 |
| Test Piece Foaming | | | |
| Product Weight (g.) | 106 | 130 | 127 |
| Total Average Density (g/cm$^3$) | 0.403 | 0.497 | 0.483 |
| Cover Pack Factor (%) | 6.95 | 9.38 | 6.71 |
| Volume Ratio | 1.093 | 1.093 | 1.093 |
| Average Thickness of High Density Outer Layer (mm) | 1.2 | 1.0 | 1.5 |
| Density of High Density Outer Layer (g/cm$^3$) | 0.615 | 0.733 | 0.751 |
| Density of Inner Foam Layer (g/cm$^3$) | 0.336 | 0.438 | 0.368 |
| Cellular structure | fair | fair | fair |
| Hardness JIS-C Type (S-6050) | 94 | 96 | 95 |

INVENTIVE EXAMPLE 4

Seven liquid mixtures conditioned at 20° C. were prepared by mixing together a polyol consisting of tri-functional polyetherpolyol (Sumiphen-3063; OHV=28 mg-KOH/g manufactured by Sumitomo Bayer Urethane Co., Ltd.), a cross-linker consisting of 1,4-butanediol (first grade reagent), a blowing agent consisting of distilled water, a catalyst consisting of U-CAT 2030, U-CAT 2044 and U-CAT SA1, and a heat build-up agent consisting of n-butylamine (first grade reagent), di-n-butylamine (first grade reagent), n-amylamine (guaranteed reagent), di-n-amylamine (first grade reagent) and ethyl alcohol (first grade reagent). Formulations of these seven liquid mixtures are shown in Tables 12 and 13. To the respective mixtures, a crude MDI (PAPI-135 manufactured by Mitsubushi Kasai Dow Co., Ltd.) conditioned at 20° C. was added and immediately thereafter the resultant mixtures were homogeneously mixed by stirring with a homomixer for 6 seconds.

The temperature of the homogeneously mixed plastic liquids was measured by alcohol thermometers to observe changes in temperature with time as the reaction advances. Results obtained are shown in Tables 12 and 13. As evidenced from Tables 12 and 13, n-butylamine and n-amylamine display an effective heat build-up effect even when loadings are low.

COMPARATIVE EXAMPLE 4

For comparative purposes, two liquid mixtures were prepared by using the procedure set forth in Inventive Example 4 except that none of the heat build-up agent were added. Results of measurement on changes in temperature with time are shown in Table 13. As is apparent from Tables 12 and 13, exothermic heat of the plastic liquid mixtures is largely influenced by the cross-linker loadings and the presence of heat build-up agent

INVENTIVE EXAMPLE 5

Four liquid mixtures conditioned at 20° C. were prepared by mixing together a polyol consisting of tri-functional polyetherpolyol (Sumiphen-3063; OHV=28 mg-KOH/g manufactured by Sumitomo Bayer Urethane Co., Ltd.), a cross-linker consisting of 1,4-butanediol (first grade reagent), a blowing agent consisting of distilled water, a catalyst consisting of U-CAT 2030, U-CAT 2044 and U-CAT SA1, and a heat build-up agent consisting of n-butylamine (first grade reagent) showing an effective heat build-up reaction at low loadings as described above. Formulations of these liquid mixtures are shown in Table 14. To the respective mixtures, a crude MDI (PAPI-135 manufactured by Mitsubushi Kasai Dow Co., Ltd.) conditioned at 20° C. was added and immediately thereafter the resultant mixtures were homogeneously mixed by stirring with a homomixer for 6 seconds. Each of the homogeneous mixtures thus obtained was immediately poured into an aluminum mold with a lockable cover or lid of 20 mm thick (effective space size of the mold=10 mm in thickness × 160 mm in width × 150 mm in length; the mold of this type is hereinafter referred to as "test piece mold"). The lid of the test piece mold was then closed and clamped to withstand the blowing pressure. After the poured mixture was allowed to stand for 5 minutes, the lid was opened and a foamed article was removed from the test piece mold. The foamed article was cut across the thickness thereof for observation of the cross section of the foamed article. The observation indicated that the foamed articles were semi-rigid urethane foams having a homogeneous finely-divided cellular structure with an adequately formed high density outer surface layer. Properties of the urethane foams thus obtained are shown in Tables 14 and 15.

By using a low pressure foaming machine with a mechanical stirring unit, each of the above-mentioned homogeneously mixed liquid mixtures (urethane stock solution) was also pored through a 5 mm sprue into a working mold used for the production of a steering wheel grip while the working mold is being locked mechanically. After the poured mixture was allowed to stand for 5 minutes, a foamed article was removed from the working mold. A measurement was made on each of the foamed articles to obtain a weight of burrs, flushes, etc. (generally called as "burrs") formed by overflow of the urethane stock solution from a vent hole and a parting line, and a weight of each foamed article with burrs removed. Results obtained are shown in Tables 14 and 15.

COMPARATIVE EXAMPLE 5

For comparative purposes, a same number of foam articles were produced on the test piece mold and the working mold by using the same procedure as Inventive Example 5 except that the heat build-up agent was not used. The foam articles were cut across the thickness for observation of the cell structure. Observation indicated that the foam articles were semi-rigid urethane foams having a homogeneous fine cellular structure, but a clear distinction between a high density outer surface layer and an inner layer could not possible due to a small difference in density between those two layers. Burrs on the urethane foams were larger in amount than burrs of the urethane foams using the heat build-up agent. Properties of the urethane foams are shown in Tables 16 and 17.

INVENTIVE EXAMPLE 6

Foam articles were produced on the test piece mold and the working mold by using the mixture used in Inventive Example 5-(1) and the procedure set forth in Inventive Example 5 except that pouring amount was adjusted to change the density and overpack factor of the foam articles. Properties of the foam articles obtained are shown in Tables 18 and 19.

COMPARATIVE EXAMPLE 6

Foam articles were produced on the test piece mold and the working mold by using the mixture used in Comparative Example 5-(1) and the procedure set forth in Comparative Example 5. Observation indicated that the foam articles thus obtained have a larger amount of burrs than the foam articles produced from a mixture containing a heat build-up agent. Properties of the foam articles obtained are shown in Tables 18 and 19.

INVENTIVE EXAMPLE 7

Foam articles were produced on the test piece mold by using the mixture used in Inventive Example 5-(1) and the procedure set forth in Inventive Example 5 except that the mold temperature was changed stepwise between 25° C., 35° C., 45° C. and 50° C. The form articles obtained were cut across the thickness for observation of the cell structure. Observation indicated that the foam articles formed at the mold temperature of 25° C. and 35° C. were semi-rigid urethane foams having a homogeneous fine cellular structure with an excellent high density outer surface layer; and even in the case the foam article produced at the mold temperature of 50° C., formation of a high density outer surface layer could be confirmed. Properties of the foam articles obtained are shown in Table 20.

COMPARATIVE EXAMPLE 7

Foam articles were produced on the test piece mold by using the mixture used in Comparative Example 5-(1) and the procedure set forth in Comparative Example 5 except that the mold temperature was changed stepwise between 25° C., 35° C., 45° C. and 50° C. The form articles obtained were cut across the thickness for observation of the cell structure. Observation indicated that only the foam article formed at the mold temperature of 25° C. was a semi-rigid urethane foam having a homogeneous fine cellular structure with an excellent high density outer surface layer; and as the mold temperature goes up from 35° C. to 50° C., distinction between a high density outer surface layer and an inner layer became impossible due to a small difference in density between those two layers. Properties of the foam articles obtained are shown in Table 21.

A comparative study of the foregoing Inventive Examples and Comparative Examples will clearly express various advantageous features of the present invention.

For instance, Inventive Example 4 and Comparative Example 4 display a heat build-up effect attained by the heat build-up agent.

In general, the physical properties (elongation and hardness, in particular) of a foam article are deteriorated as the content of water increases or when a blowing agent consisting of water alone is used. In order to avoid this, the content of water or water absorptive resin saturated with water is reduced. Reduction of the water content, however, leads to a reduction of the extent of foaming and a reduction of the reaction heat which will hinder formation of a distinctive high density outer surface layer. In addition, curing of the plastic liquid is retarded and polymerization of the plastic liquid takes place slowly, so that a large amount of plastic liquid is overflown from the vent hole or the parting line. These difficulties can be overcome by the heat build-up agent of the invention as evidenced by a comparative study of Inventive Example 5-(2) and Comparative Example 5-(2).

As is apparent from a comparative study of Inventive Example 5-(3) and Comparative Example 5-(3), the foregoing problems associated with the use of a catalyst consisting of water or water absorptive resin saturated with water can be overcome by low-molecular polyols added as a crosslinker or a chain extender. When the low-molecular polyol content is reduced, then the high density outer surface becomes undistinctive and the amount of overflow from the vent hole or the parting line increases again. These problems do not take place when the heat build-up agent of the invention is used.

Inventive Example 5-(4) and Comparative Example 5(4) shows a remarkable effect of the heat build-up agent attained when both of the water content (or water absorptive resin content) and the low-molecular polyol content are reduced.

When the overpack factor of a plastic liquid (urethane stock solution) in which a blowing agent consisting of water or water absorptive resin saturated with water is used is lowered, the amount of exothermic heat produced during reaction of the plastic liquid goes down with the result that a high density outer surface layer is hardly distinctive from an inner layer and the amount of overflow from the vent hole or the parting line increases. These problems can be overcome by adjusting the amount of heat build-up agent, as evidenced by a comparative study of the Inventive Examples 6-(1) and 6-(2) and Comparative Examples 6-(1) and 6-(2).

Inventive Example 7 and Comparative Example 7 prove an advantageous effect of the heat build-up agent attained when the mold temperature is changed.

As described above, the heat build-up agent positively creates a difference in foaming reaction of the plastic liquid between an outer surface layer and an inner layer as gelation by polymerization and blowing of the plastic liquid proceeds, even when the water catalyst content and the crosslinker content are reduced. With the reaction difference thus created, a high density outer surface layer which is distinctive from the inner layer is formed on the outside surface of a foam article. The heat build-up agent is effective to lower the amount of burrs formed by overflow of the plastic liquid due to accumulated working tolerance of the mold and diminish negative influence exerted by the temperature rise on the formation of a high density outer surface layer.

TABLE 12

| Formulation | Inventive Example 4 | | | | |
|---|---|---|---|---|---|
| | (1) | (2) | (3) | (4) | (5) |
| Blend A (gram) | | | | | |
| Sumiphen-3063 | 95.0 | 95.0 | 95.0 | 95.0 | 95.0 |
| Distilled Water | 1.0 | 1.0 | 1.0 | 1.0 | 1.0 |
| U-CAT 2030 | 0.6 | 0.6 | 0.6 | 0.6 | 0.6 |
| U-CAT 2044 | 0.6 | 0.6 | 0.6 | 0.6 | 0.6 |
| Ethyl alcohol | 5.0 | | | | |
| n-butylamine | | 1.0 | | | |
| di-n-butylamine | | | 5.0 | | |
| n-amylamine | | | | 1.0 | |
| di-n-amylamine | | | | | 5.0 |
| Blend B (gram) | | | | | |
| PAPI-135 | 36.2 | 23.3 | 26.7 | 23.0 | 25.8 |
| Temperature change with time (°C.) | | | | | |
| 0 sec. later | 22.0 | 23.0 | 22.0 | 22.0 | 22.0 |
| 30 sec. later | 30.0 | 30.0 | 31.5 | 28.0 | 31.5 |
| 40 sec. later | 35.0 | 32.0 | 33.0 | 31.0 | 33.0 |
| 50 sec. later | 39.0 | 34.2 | 35.0 | 33.0 | 35.0 |
| 60 sec. later | 42.5 | 36.0 | 36.5 | 35.0 | 36.5 |
| 70 sec. later | 45.0 | 37.8 | 38.5 | 36.7 | 38.5 |
| 90 sec. later | 50.0 | 40.2 | 41.6 | 40.0 | 41.6 |
| 120 sec. later | 55.0 | 43.8 | 45.2 | 43.3 | 45.2 |
| 180 sec. later | 57.0 | 49.0 | 54.5 | 49.0 | 50.4 |

TABLE 13

| Formulation | Inventive Example 4 | | Comparative Example 4 | |
|---|---|---|---|---|
| | (6) | (7) | (1) | (2) |
| Blend A (gram) | | | | |
| Sumiphen-3063 | 95.0 | 95.0 | 95.0 | 95.0 |
| Distilled Water | 1.0 | 1.0 | 1.0 | 1.0 |
| U-CAT 2030 | 0.6 | 0.6 | 0.6 | 0.6 |
| U-CAT 2040 | 0.6 | 0.6 | 0.6 | 0.6 |
| U-CAT SA1 | | 0.2 | | |
| 1,4-butanediol | 3.0 | 3.0 | | 3.0 |
| n-butylamine | 1.0 | 1.0 | | |
| Blend B (gram) | | | | |
| PAPI-135 | 32.7 | 32.7 | 21.5 | 30.9 |
| Temperature change with time (°C.) | | | | |
| 0 sec. later | 23.0 | 23.0 | 22.0 | 23.0 |
| 30 sec. later | 37.0 | 36.0 | 20.0 | 31.0 |
| 40 sec. later | 40.0 | 39.2 | 30.0 | 35.0 |
| 50 sec. later | 43.5 | 43.5 | 31.0 | 37.5 |
| 60 sec. later | 46.0 | 46.0 | 32.0 | 40.0 |
| 70 sec. later | 48.5 | 48.4 | 33.5 | 43.0 |
| 90 sec. later | 52.0 | 52.1 | 36.0 | 47.0 |
| 120 sec. later | 56.0 | 56.8 | 39.4 | 51.0 |
| 180 sec. later | 62.2 | 63.3 | 43.0 | 57.4 |

TABLE 14

| | Inventive Example 5 | | | |
|---|---|---|---|---|
| | (1) | (2) | (3) | (4) |
| Formulation (gram) | | | | |
| Blend A | | | | |
| Sumiphen-3063 | 95.0 | 95.0 | 95.0 | 95.0 |
| Distilled Water | 1.5 | 1.0 | 1.5 | 1.3 |
| 1,4-butanediol | 5.0 | 5.0 | 3.0 | 4.0 |
| U-CAT 2030 | 0.7 | 0.7 | 0.7 | 0.7 |

TABLE 14-continued

| | Inventive Example 5 | | | |
|---|---|---|---|---|
| | (1) | (2) | (3) | (4) |
| U-CAT 2044 | 0.5 | 0.5 | 0.5 | 0.5 |
| U-CAT SA1 | 0.2 | 0.2 | 0.2 | 0.2 |
| n-butylamine | 1.0 | 1.0 | 1.0 | 1.0 |
| Blend B | | | | |
| PAPI-135 | 46.5 | 39.0 | 40.3 | 40.2 |
| Free Foaming Reactivity (second) | | | | |
| Cream Time | 9 | 10 | 9 | 10 |
| Rise Time | 36 | 36 | 46 | 42 |
| Tack-free Time | 40 | 40 | 60 | 50 |
| Free Core Density (g/cm$^3$) | 0.672 | 0.670 | 0.679 | 0.664 |
| Article Foamed in Test Piece Mold | | | | |
| Product Weight (g) | 160 | 161 | 160 | 159 |
| Total Average Density (g/cm$^3$) | 0.672 | 0.670 | 0.679 | 0.664 |
| Overpack Factor (*1) | 5.90 | 3.82 | 6.66 | 5.23 |
| Volume Ratio (*2) | 0.991 | 0.994 | 0.981 | 0.990 |

(*1): Total Average Density/Free Core Density
(*2): Product Volume/Mold Cavity Volume

TABLE 15

| | Inventive Example 5 | | | |
|---|---|---|---|---|
| | (1) | (2) | (3) | (4) |
| Article Foamed in Test Piece Mold | | | | |
| Average Thickness of High Density Surface Layer (mm) | 1.3 | 1.3 | 1.2 | 1.3 |
| Density of High Density Surface Layer (g/cm$^3$) | 1.118 | 1.206 | 1.083 | 1.103 |
| Density of Inner Foam Layer (g/cm$^3$) | 0.515 | 0.481 | 0.551 | 0.509 |
| Cellular Structure | Fair | Fair | Fair | Fair |
| Hardness JIS-C Type (S-6050) | 91 | 81 | 84 | 82 |
| Article Foamed in Working Mold | | | | |
| Pouring Time (sec.) (at 100 g/sec. set) | 8.0 | 8.0 | 8.0 | 8.0 |
| Product Weight (g) (Urethane alone) | 584 | 590 | 575 | 586 |
| Plastic Liquid Overflow (g) (Burrs, etc) | 52 | 43 | 64 | 50 |

TABLE 16

| | Comparative Example 5 | | | |
|---|---|---|---|---|
| | (1) | (2) | (3) | (4) |
| Formulation (gram) | | | | |
| Blend A | | | | |
| Sumiphen-3063 | 95.0 | 95.0 | 95.0 | 95.0 |
| Distilled Water | 1.5 | 1.0 | 1.5 | 1.3 |
| 1,4-butanediol | 5.0 | 5.0 | 3.0 | 4.0 |
| U-CAT 2030 | 0.7 | 0.7 | 0.7 | 0.7 |
| U-CAT 2044 | 0.5 | 0.5 | 0.5 | 0.5 |
| U-CAT SA1 | 0.2 | 0.2 | 0.2 | 0.2 |
| n-butylamine | | | | |
| Blend B | | | | |
| PAPI-135 | 46.5 | 39.0 | 40.3 | 40.2 |
| Free Foaming Reactivity (second) | | | | |
| Cream Time | 15 | 15 | 14 | 17 |
| Rise Time | 45 | 44 | 55 | 49 |
| Tack-free Time | 50 | 50 | 70 | 60 |
| Free Core Density (g/cm$^3$) | 0.116 | 0.187 | 0.110 | 0.129 |
| Article Foamed in Test Piece Mold | | | | |
| Product Weight (g) | 161 | 160 | 159 | 160 |
| Total Average Density (g/cm$^3$) | 0.672 | 0.672 | 0.662 | 0.670 |

TABLE 16-continued

|  | Comparative Example 5 | | | |
| --- | --- | --- | --- | --- |
|  | (1) | (2) | (3) | (4) |
| Overpack Factor (*1) | 5.79 | 3.60 | 6.02 | 5.20 |
| Volume Ratio (*2) | 0.991 | 0.991 | 0.994 | 0.994 |

(*1): Total Average Density/Free Core Density
(*2): Product Volume/Mold Cavity Volume

TABLE 17

|  | Comparative Example 5 | | | |
| --- | --- | --- | --- | --- |
|  | (1) | (2) | (3) | (4) |
| Article Foamed in Test Piece Mold | | | | |
| Average Thickness of High Density Surface Layer (mm) | 1.0 | 1.2 | 1.0 | 1.1 |
| Density of High Density Surface Layer (g/cm$^3$) | 0.926 | 1.047 | 1.088 | 1.028 |
| Density of Inner Foam Layer (g/cm$^3$) | 0.608 | 0.553 | 0.555 | 0.569 |
| Cellular Structure | Fair | Fair | Fair | Fair |
| Hardness JIS-C Type (S-6050) | 91 | 83 | 84 | 84 |
| Article Foamed in Working Mold | | | | |
| Pouring Time (sec.) (at 100 g/sec. set) | 8.0 | 8.0 | 8.0 | 8.0 |
| Product Weight (g) (Urethane alone) | 554 | 562 | 538 | 555 |
| Plastic Liquid Overflow (g) (Burrs, etc) | 83 | 72 | 95 | 79 |

TABLE 18

|  | Inventive Example 6 | | Comparative Example 6 | |
| --- | --- | --- | --- | --- |
|  | (1) | (2) | (1) | (2) |
| Article Foamed in Test Piece Mold | | | | |
| Product Weight (g) | 119 | 172 | 120 | 173 |
| Total Average Density (g/cm$^3$) | 0.495 | 0.723 | 0.503 | 0.725 |
| Overpack Factor | 4.34 | 6.34 | 4.34 | 6.25 |
| Volume Ratio (*1) | 0.994 | 0.984 | 0.994 | 0.987 |
| Average Thickness of High Density Surface Layer (mm) | 0.5 | 1.3 | 0.5 | 1.2 |
| Density of High Density Surface Layer (g/cm$^3$) | 0.961 | 1.090 | 0.945 | 1.100 |
| Density of Inner Foam Layer (g/cm$^3$) | 0.443 | 0.593 | 0.453 | 0.606 |
| Cellular Structure | Fair | Fair | Fair | Fair |
| Hardness JIS-C Type (S-6050) | 87 | 91 | 87 | 91 |

(*1) Presumably, differences in volume ratio are caused by gas expansion of a foam occurring when the foam is removed from a mold, which expansion is larger in a low density foam than in a high density foam and still exerts influence on the product weight after the foam is set.

TABLE 19

|  | Inventive Example 6 | | Comparative Example 6 | |
| --- | --- | --- | --- | --- |
|  | (1) | (2) | (1) | (2) |
| Article Foamed in Working Mold | | | | |
| Pouring Time (sec.) (at 100 g/sec. set) | 6.0 | 9.0 | 6.0 | 9.0 |
| Product Weight (g) (Urethane alone) | 446 | 659 | 422 | 625 |
| Plastic Liquid Overflow (g) (Burrs, etc) | 35 | 59 | 53 | 98 |

TABLE 20

|  | Inventive Example 7 | | | |
| --- | --- | --- | --- | --- |
|  | (1) | (2) | (3) | (4) |
| Article Foamed in Test Piece Mold | | | | |
| Mold Temperature (°C.) | 25 | 35 | 45 | 50 |
| Product Weight (g) | 161 | 160 | 159 | 159 |
| Total Average Density (g/cm$^3$) | 0.676 | 0.679 | 0.675 | 0.675 |
| Overpack Factor | 5.93 | 5.96 | 5.92 | 5.92 |
| Volume Ratio | 0.991 | 0.981 | 0.981 | 0.981 |
| Average Thickness of High Density Surface Layer (mm) | 1.3 | 0.8 | 0.5 | 0.2 |
| Density of High Density Surface Layer (g/cm$^3$) | 1.118 | 1.088 | 0.965 | 0.894 |
| Density of Inner Foam Layer (g/cm$^3$) | 0.520 | 0.601 | 0.642 | 0.665 |
| Cellular Structure | Fair | Fair | Fair | Fair |
| Hardness JIS-C Type (S-6050) | 91 | 90 | 87 | 83 |

TABLE 21

|  | Comparative Example 7 | | | |
| --- | --- | --- | --- | --- |
|  | (1) | (2) | (3) | (4) |
| Article Foamed in Test Piece Mold | | | | |
| Mold Temperature (°C.) | 25 | 35 | 45 | 50 |
| Product Weight (g) | 161 | 159 | 159 | 159 |
| Total Average Density (g/cm$^3$) | 0.672 | 0.670 | 0.675 | 0.675 |
| Overpack Factor | 5.79 | 5.78 | 5.82 | 5.82 |
| Volume Ratio | 0.991 | 0.981 | 0.981 | 0.981 |
| Average Thickness of High Density Surface Layer (mm) | 1.0 | 0.5 | 0.2 | 0.1 |
| Density of High Density Surface Layer (g/cm$^3$) | 1.026 | 0.993 | 0.944 | 0.857 |
| Density of Inner Foam Layer (g/cm$^3$) | 0.583 | 0.634 | 0.661 | 0.671 |
| Cellular Structure | Fair | Fair | Fair | Fair |
| Hardness JIS-C Type (S-6050) | 91 | 86 | 85 | 82 |

What is claimed is:

1. A process for producing a urethane foam having a high density outer surface layer, of the type wherein a plastic liquid containing di or polyisocynates, polyols, a catalyst, low-molecular polyols used as a crosslinker or a chain extender, a blowing agent consisting of water, and an assistant is poured into a closed mold through a one-shot molding process, wherein the improvement comprises:

adding, a catalyst, consisting of a piperazine compound in combination with an imidazole compound, a triazine compound, an amidine compound or an organic acid salt of said amidine compound, or a mixture resulting from any combination thereof, for causing the di or polyisocynates and the blowing agent to create a difference in gas evolving reaction between an inner part and an outer part of the plastic liquid within the mold so as to form a high density layer on the outer surface of a urethane form;

said imidazole compound is a imidazole ether compound, a 1-substituted imidazole compound, or a mixture thereof, said imidazole ether compound being at least one selected from the group consisting of 1,1'-(oxydiethylene)bis(2-methylimidazone, and a 1,1'-(oxydiethylene)bis(imidazole), said 1-substituted imidazole compound being at least one selected from the group consisting of 1- methylimidazole, 1-ethylimidazole, 1-propylimidazole, 1-butylimidazole, 1,2-dimethylimidazol, and 1-ethyl-2-methylimidazole;

said triazine compound is at least one selected from the group consisting of N,N',N''-tris(dimethylaminopropyl)hexahydro-S-triazine, an organic acid salt of said N,N',N''-tris(dimethylaminopropyl)hexahydro-S-triazine, and a mixture thereof;

said amidine compound is at least one selected from the group consisting of 1,8-diazabicycro(5,4,0)-7-undecene and an organic acid salt of said 1,8-diazabicycro(5,4,0)-7-undecene;

said assistant comprises a heat build-up agent which is capable of building up heat when chemically reacted with di or polyisocynates and is inactive as a crosslinker, said heat build-up agent comprising ethanol, a monoamine, or a mixture thereof;

said monoamine is a primary amine or a secondary amine which is a derivative of $NH_3$ in which there is a replacement for one or two of the H atoms of $NH_3$ by an alkyl group, said monoamine being at least one selected from the group consisting of n-butylamine(1-aminobuthane), N-dibutylamine, pentylamine(n-amylamine, 1-aminopenthane), and dipentylamine(di-n-amylamine).

2. A process according to claim 1, wherein said blowing agent is water absorbed in a water absorptive resin.

3. A process according to claim 1, wherein the mold is maintained at a temperature in the range of from 15° to 45° C., preferably from 20° to 35° C., and said plastic liquid is maintained at a temperature in the range of from 15° to 30° C.

* * * * *